US012812133B2

(12) United States Patent
Naser et al.

(10) Patent No.: US 12,812,133 B2
(45) Date of Patent: Nov. 24, 2026

(54) INTRA TEMPLATE MATCHING WITH FLIPPING

(71) Applicant: InterDigital CE Patent Holdings, SAS, Paris (FR)

(72) Inventors: Karam Naser, Mouazé (FR); Tangi Poirier, Thorigné-Fouillard (FR); Franck Galpin, Thorigne-Fouillard (FR); Antoine Robert, Mézières sur Couesnon (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/877,728

(22) PCT Filed: Jun. 26, 2023

(86) PCT No.: PCT/EP2023/067266

§ 371 (c)(1),
(2) Date: Dec. 20, 2024

(87) PCT Pub. No.: WO2024/002947

PCT Pub. Date: Jan. 4, 2024

(65) Prior Publication Data

US 2025/0373820 A1 Dec. 4, 2025

(30) Foreign Application Priority Data

Jul. 1, 2022 (EP) .................................... 22305985

(51) Int. Cl.
*H04N 19/176* (2014.01)
*G06V 10/75* (2022.01)

(52) U.S. Cl.
CPC ......... *H04N 19/176* (2014.11); *G06V 10/751* (2022.01)

(58) Field of Classification Search
CPC ........................... H04N 19/176; G06V 10/751
USPC .................................................... 375/240.12
See application file for complete search history.

(56) References Cited

PUBLICATIONS

Cao et al, "Intra Block Copy Mirror Mode for Screen Content Coding in Versatile Video Coding", pp. 31390-31400 (Year: 2021).*
Cao et al., "An Intra-Affine Current Picture Referencing Mode for Screen Content Coding in VVC", 2019 Picture Coding Symposium (PCS), Ningbo, China, IEEE, Nov. 12-15, 2019, 5 pages.

(Continued)

*Primary Examiner* — Amir Shahnami
(74) *Attorney, Agent, or Firm* — Condo Roccia Koptiw LLP

(57) ABSTRACT

Systems, methods, and instrumentalities are disclosed herein for the field of video encoding and decoding. In examples, a video decoder or encoder may determine that a template-based prediction is enabled for a current block. A prediction block and a template orientation for the current block may be determined based on template matching. The decoder or encoder may decode or encode the current block based on the prediction block and the template orientation. In examples, the prediction block may be adjusted (e.g., horizontally flipped, vertically flipped, diagonally flipped, and/or rotated) based on the determined template orientation and the current block may be decoded or encoded based on the adjusted (e.g., reoriented) prediction block.

20 Claims, 13 Drawing Sheets

200

(56) References Cited

PUBLICATIONS

Cao et al., "Intra Block Copy Mirror Mode for Screen Content Coding in Versatile Video Coding", IEEE Access, vol. 9, Feb. 19, 2021, pp. 31390-31400.
Coban et al., "Algorithm description of Enhanced Compression Model 4 (ECM 4)", Editors, JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, 32 pages.
Deng et al., "Non-EE2: Reconstruction-Reordered IBC for screen content coding", Bytedance Inc., JVET-Z0159-v1, Joint Video Experts Team (JVET) of ITU-T SG 16 WP 3 and ISO/IEC JTC 1/SC 29, 26th Meeting, by teleconference, Apr. 20-29, 2022, 3 pages.

* cited by examiner

100

200

300

INTRA TEMPLATE MATCHING WITH FLIPPING

CROSS-REFERENCE TO RELATED APPLICATIONS

This application is the National Stage Entry under 35 U.S.C. § 371 of Patent Cooperation Treaty Application No. PCT/EP2023/067266, filed Jun. 26, 2023, claims the benefit of European Patent Application 22305985.8, filed Jul. 1, 2022, the disclosure of which is incorporated herein by reference in its entirety.

BACKGROUND

Video coding systems can be used to compress digital video signals, e.g., to reduce the storage and/or transmission bandwidth needed for such signals. Video coding systems can include, for example, block-based, wavelet-based, and/or object-based systems.

SUMMARY

Systems, methods, and instrumentalities are disclosed herein for the field of video encoding and decoding.

In examples, video device, such as a video decoder, or a video encoder, may determine that a template-based prediction is enabled for a current block. A prediction block and a template orientation for the current block may be determined based on template matching. A video decoder may decode the current block based on the prediction block and the template orientation. A video encoder may encode the current block based on the prediction block and the template orientation. The prediction block may be adjusted (e.g., horizontally flipped, vertically flipped, diagonally flipped, or rotated) based on the determined template orientation and the current block may be decoded and/or encoded based on the adjusted (e.g., reoriented) prediction block.

For example, a plurality of template orientations can be obtained, and the template orientation may be selected from the plurality of template orientations. Template matching search may be performed based on different template orientations, and the template differences that correspond to the different orientations may be compared. A template orientation may be selected based on the comparison. In examples, the video device may perform template matching search in a first template orientation and a second template orientation. The video device may compute the template difference between the template of the current block and the template of a first prediction block in the first template orientation and the template difference between the template of the current block and the template of a second prediction block in the second template orientation. The prediction block and the template orientation for the current block may be determined based on a smaller template difference of the template differences.

The video device may perform a refinement search in multiple template orientations. In examples, the video device may determine a matching block based on a first template matching search associated with an upright template orientation. A refinement search area may be determined based on the matching block for performing a second template matching search (e.g., refinement search in multiple template orientations). The prediction block and the template orientation for the current block may be determined based on the second template matching search performed within the refinement search area.

These examples can be performed by a video processing device with a processor. The device can be an encoder or a decoder. These examples can be performed by a computer program product which is stored on a non-transitory computer readable medium and includes program code instructions. These examples can be performed by a computer program comprising program code instructions. These examples can be performed by a bitstream comprising information representative of the template matching prediction mode.

Systems, methods, and instrumentalities described herein can involve a decoder. In some examples, the systems, methods, and instrumentalities described herein can involve an encoder. In some examples, the systems, methods, and instrumentalities described herein can involve a signal (e.g., from an encoder and/or received by a decoder). A computer-readable medium can include instructions for causing one or more processors to perform methods described herein. A computer program product can include instructions which, when the program is executed by one or more processors, can cause the one or more processors to carry out the methods described herein.

DETAILED DESCRIPTION

A more detailed understanding can be had from the following description, given by way of example in conjunction with the accompanying drawings.

Figure 1A:
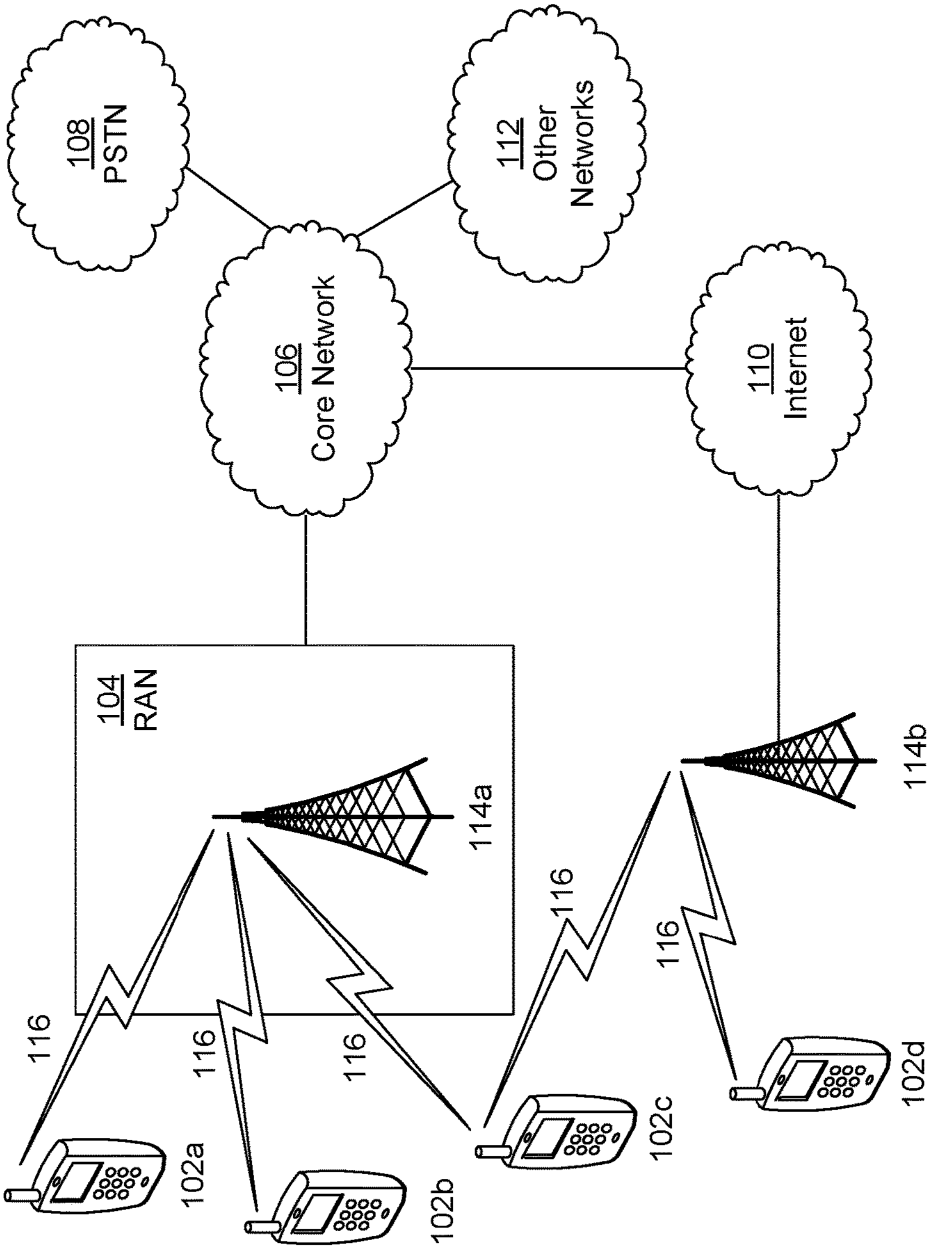
FIG. 1A is a system diagram illustrating an example communications system in which one or more disclosed embodiments can be implemented.

FIG. 1A is a diagram illustrating an example communications system 100 in which one or more disclosed embodiments can be implemented. The communications system 100 can be a multiple access system that provides content, such as voice, data, video, messaging, broadcast, etc., to multiple wireless users. The communications system 100 can enable multiple wireless users to access such content through the sharing of system resources, including wireless bandwidth. For example, the communications systems 100 can employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 can include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* can be any type of device configured to operate and/or communicate in a wireless environment. By way of example, the WTRUs 102*a*, 102*b*, 102*c*, 102*d*, any of which can be referred to as a "station" and/or a "STA", can be configured to transmit and/or receive wireless signals and can include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* can be interchangeably referred to as a UE.

The communications systems 100 can also include a base station 114*a* and/or a base station 114*b*. Each of the base stations 114*a*, 114*b* can be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* can be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114a, 114*b* can include any number of interconnected base stations and/or network elements.

The base station 114*a* can be part of the RAN 104/113, which can also include other base stations and/or network elements (not shown), such as a base station controller (BSC), a radio network controller (RNC), relay nodes, etc. The base station 114*a* and/or the base station 114*b* can be configured to transmit and/or receive wireless signals on one or more carrier frequencies, which can be referred to as a cell (not shown). These frequencies can be in licensed spectrum, unlicensed spectrum, or a combination of licensed and unlicensed spectrum. A cell can provide coverage for a wireless service to a specific geographical area that can be relatively fixed or that can change over time. The cell can further be divided into cell sectors. For example, the cell associated with the base station 114*a* can be divided into three sectors. Thus, in one embodiment, the base station 114*a* can include three transceivers, i.e., one for each sector of the cell. In an embodiment, the base station 114*a* can employ multiple-input multiple output (MIMO) technology and can utilize multiple transceivers for each sector of the cell. For example, beamforming can be used to transmit and/or receive signals in desired spatial directions.

The base stations 114*a*, 114*b* can communicate with one or more of the WTRUs 102*a*, 102*b*, 102*c*, 102*d* over an air interface 116, which can be any suitable wireless communication link (e.g., radio frequency (RF), microwave, centimeter wave, micrometer wave, infrared (IR), ultraviolet (UV), visible light, etc.). The air interface 116 can be established using any suitable radio access technology (RAT).

More specifically, as noted above, the communications system 100 can be a multiple access system and can employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* can implement a radio technology such as Universal Mobile Telecommunications System (UMTS) Terrestrial Radio Access (UTRA), which can establish the air interface 115/116/117 using wideband CDMA (WCDMA). WCDMA can include communication protocols such as High-Speed Packet Access (HSPA) and/or Evolved HSPA (HSPA+). HSPA can include High-Speed Downlink (DL) Packet Access (HSDPA) and/or High-Speed UL Packet Access (HSUPA).

In an embodiment, the base station 114*a* and the WTRUs 102*a*, 102*b*, 102*c* can implement a radio technology such as Evolved UMTS Terrestrial Radio Access (E-UTRA), which can establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* can implement a radio technology such as NR Radio Access, which can establish the air interface 116 using New Radio (NR).

In an embodiment, the base station 114*a* and the WTRUs 102*a*, 102*b*, 102*c* can implement multiple radio access technologies. For example, the base station 114*a* and the WTRUs 102*a*, 102*b*, 102*c* can implement LTE radio access and NR radio access together, for instance using dual connectivity (DC) principles. Thus, the air interface utilized by WTRUs 102*a*, 102*b*, 102*c* can be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* can implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A can be a wireless router, Home Node B, Home eNode B, or access point, for example, and can utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* can implement a radio technology such as IEEE 802.11 to establish a wireless local area network (WLAN). In an embodiment, the base station 114*b* and the WTRUs 102*c*, 102*d* can implement a radio technology such as IEEE 802.15 to establish a wireless personal area network (WPAN). In yet another embodiment, the base station 114*b* and the WTRUs 102*c*, 102*d* can utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* can have a direct connection to the Internet 110. Thus, the base station 114*b* can not be required to access the Internet 110 via the CN 106/115.

The RAN 104/113 can be in communication with the CN 106/115, which can be any type of network configured to provide voice, data, applications, and/or voice over internet protocol (VoIP) services to one or more of the WTRUs 102*a*, 102*b*, 102*c*, 102*d*. The data can have varying quality of service (QOS) requirements, such as differing throughput requirements, latency requirements, error tolerance requirements, reliability requirements, data throughput requirements, mobility requirements, and the like. The CN 106/115 can provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 can be in direct or indirect communication with other RANs that employ the same RAT as the RAN 104/113 or a different RAT. For example, in addition to being connected to the RAN 104/113, which can be utilizing a NR radio technology, the CN 106/115 can also be in communication with another RAN (not shown) employing a GSM, UMTS, CDMA 2000, WiMAX, E-UTRA, or WiFi radio technology.

The CN 106/115 can also serve as a gateway for the WTRUs 102*a*, 102*b*, 102*c*, 102*d* to access the PSTN 108, the Internet 110, and/or the other networks 112. The PSTN 108 can include circuit-switched telephone networks that provide plain old telephone service (POTS). The Internet 110 can include a global system of interconnected computer networks and devices that use common communication protocols, such as the transmission control protocol (TCP), user datagram protocol (UDP) and/or the internet protocol (IP) in the TCP/IP internet protocol suite. The networks 112 can include wired and/or wireless communications networks owned and/or operated by other service providers. For example, the networks 112 can include another CN connected to one or more RANs, which can employ the same RAT as the RAN 104/113 or a different RAT.

Some or all of the WTRUs 102*a*, 102*b*, 102*c*, 102*d* in the communications system 100 can include multi-mode capabilities (e.g., the WTRUs 102*a*, 102*b*, 102*c*, 102*d* can include multiple transceivers for communicating with different wireless networks over different wireless links). For example, the WTRU 102*c* shown in FIG. 1A can be configured to communicate with the base station 114*a*, which can employ a cellular-based radio technology, and with the base station 114*b*, which can employ an IEEE 802 radio technology.

Figure 1B:
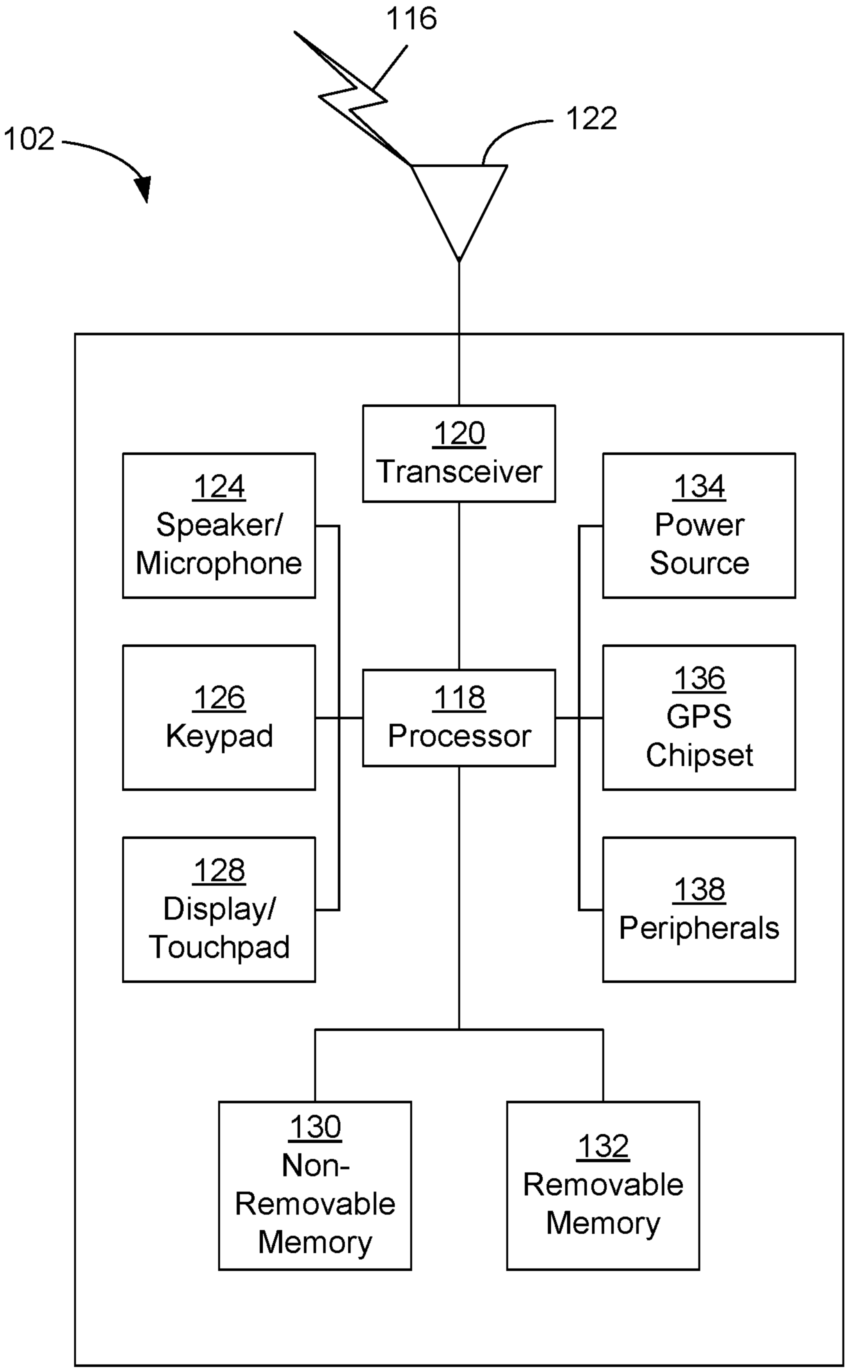
FIG. 1B is a system diagram illustrating an example wireless transmit/receive unit (WTRU) that can be used within the communications system illustrated in FIG. 1A according to an embodiment.

FIG. 1B is a system diagram illustrating an example WTRU 102. As shown in FIG. 1B, the WTRU 102 can include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 can include any sub-combination of the foregoing elements while remaining consistent with an embodiment.

The processor 118 can be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. As suggested above, the processor 118 can include a plurality of processors. The processor 118 can perform signal coding, data processing, power control, input/output processing, and/or any other functionality that enables the WTRU 102 to operate in a wireless environment. The processor 118 can be coupled to the transceiver 120, which can be coupled to the transmit/receive element 122. While FIG. 1B depicts the processor 118 and the transceiver 120 as separate components, it will be appreciated that the processor 118 and the transceiver 120 can be integrated together in an electronic package or chip.

The transmit/receive element 122 can be configured to transmit signals to, or receive signals from, a base station (e.g., the base station 114*a*) over the air interface 116. For example, in one embodiment, the transmit/receive element 122 can be an antenna configured to transmit and/or receive RF signals. In an embodiment, the transmit/receive element 122 can be an emitter/detector configured to transmit and/or receive IR, UV, or visible light signals, for example. In yet another embodiment, the transmit/receive element 122 can be configured to transmit and/or receive both RF and light signals. It will be appreciated that the transmit/receive element 122 can be configured to transmit and/or receive any combination of wireless signals.

Although the transmit/receive element 122 is depicted in FIG. 1B as a single element, the WTRU 102 can include any number of transmit/receive elements 122. More specifically, the WTRU 102 can employ MIMO technology. Thus, in one embodiment, the WTRU 102 can include two or more transmit/receive elements 122 (e.g., multiple antennas) for transmitting and receiving wireless signals over the air interface 116.

The transceiver 120 can be configured to modulate the signals that are to be transmitted by the transmit/receive element 122 and to demodulate the signals that are received by the transmit/receive element 122. As noted above, the WTRU 102 can have multi-mode capabilities. Thus, the transceiver 120 can include multiple transceivers for enabling the WTRU 102 to communicate via multiple RATs, such as NR and IEEE 802.11, for example.

The processor 118 of the WTRU 102 can be coupled to, and can receive user input data from, the speaker/microphone 124, the keypad 126, and/or the display/touchpad 128 (e.g., a liquid crystal display (LCD) display unit or organic light-emitting diode (OLED) display unit). The processor 118 can also output user data to the speaker/microphone 124, the keypad 126, and/or the display/touchpad 128. In addition, the processor 118 can access information from, and store data in, any type of suitable memory, such as the non-removable memory 130 and/or the removable memory 132. The non-removable memory 130 can include random-access memory (RAM), read-only memory (ROM), a hard disk, or any other type of memory storage device. The removable memory 132 can include a subscriber identity module (SIM) card, a memory stick, a secure digital (SD) memory card, and the like. In other embodiments, the processor 118 can access information from, and store data in, memory that is not physically located on the WTRU 102, such as on a server or a home computer (not shown).

The processor 118 can receive power from the power source 134, and can be configured to distribute and/or control the power to the other components in the WTRU 102. The power source 134 can be any suitable device for powering the WTRU 102. For example, the power source 134 can include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 can also be coupled to the GPS chipset 136, which can be configured to provide location information (e.g., longitude and latitude) regarding the current location of the WTRU 102. In addition to, or in lieu of, the information from the GPS chipset 136, the WTRU 102 can receive location information over the air interface 116 from a base station (e.g., base stations 114*a*, 114*b*) and/or determine its location based on the timing of the signals being received from two or more nearby base stations. It will be appreciated that the WTRU 102 can acquire location information by way of any suitable location-determination method while remaining consistent with an embodiment.

The processor 118 can further be coupled to other peripherals 138, which can include one or more software and/or hardware modules that provide additional features, functionality and/or wired or wireless connectivity. For example, the peripherals 138 can include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 can include one or more sensors, the sensors can be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 can include a full duplex radio for which transmission and reception of some or all of the signals (e.g., associated with particular subframes for both the UL (e.g., for transmission) and downlink (e.g., for reception) can be concurrent and/or simultaneous. The full duplex radio can include an interference management unit to reduce and or substantially eliminate self-interference via either hardware (e.g., a choke) or signal processing via a processor (e.g., a separate processor (not shown) or via processor 118). In an embodiment, the WRTU 102 can include a half-duplex radio for which transmission and reception of some or all of the signals (e.g., associated with particular subframes for either the UL (e.g., for transmission) or the downlink (e.g., for reception).

Figure 1C:
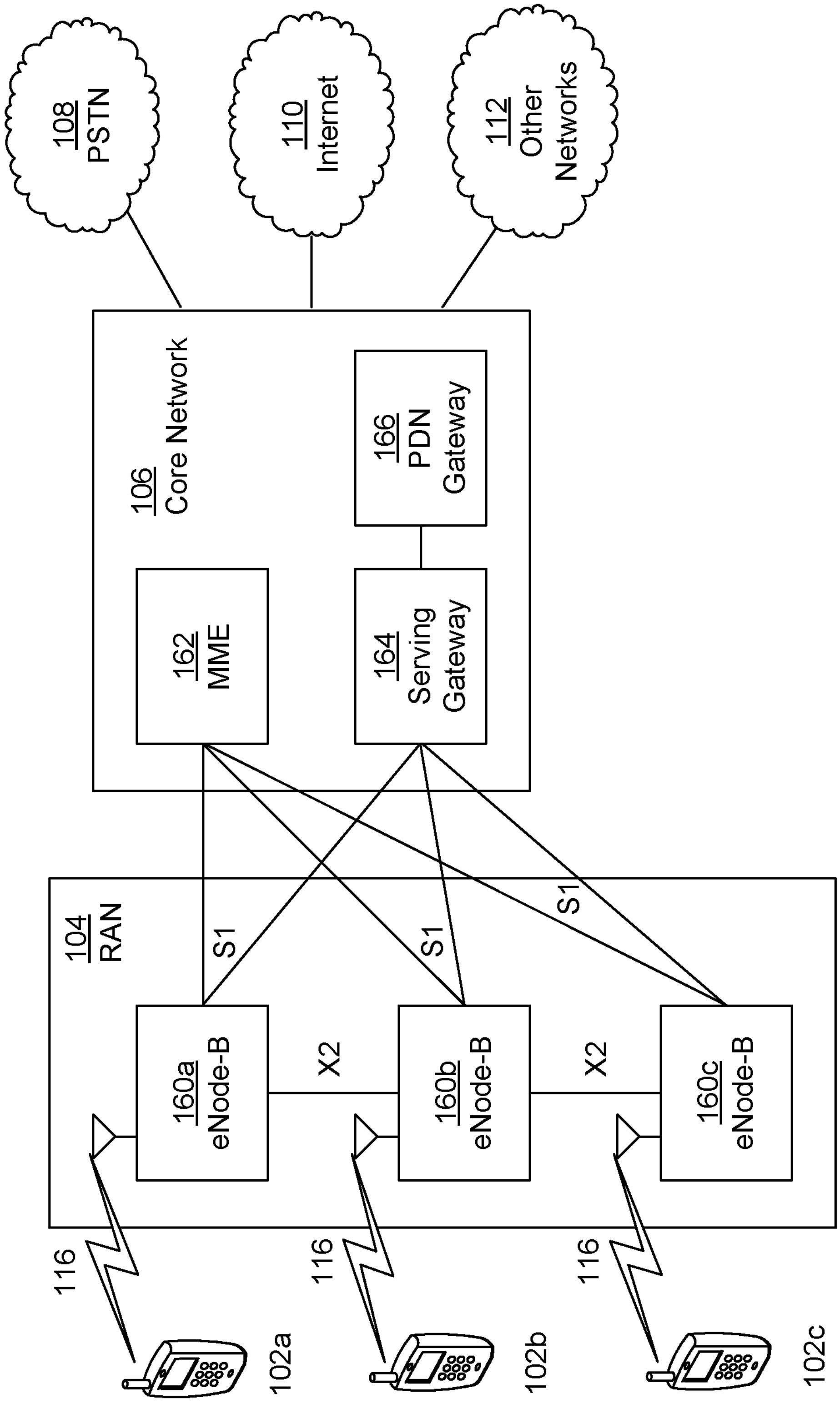
FIG. 1C is a system diagram illustrating an example radio access network (RAN) and an example core network (CN) that can be used within the communications system illustrated in FIG. 1A according to an embodiment.

FIG. 1C is a system diagram illustrating the RAN 104 and the CN 106 according to an embodiment. As noted above, the RAN 104 can employ an E-UTRA radio technology to communicate with the WTRUs 102*a*, 102*b*, 102*c* over the air interface 116. The RAN 104 can also be in communication with the CN 106.

The RAN 104 can include eNode-Bs 160*a*, 160*b*, 160*c*, though it will be appreciated that the RAN 104 can include any number of eNode-Bs while remaining consistent with an embodiment. The eNode-Bs 160*a*, 160*b*, 160*c* can each include one or more transceivers for communicating with the WTRUs 102*a*, 102*b*, 102*c* over the air interface 116. In one embodiment, the eNode-Bs 160*a*, 160*b*, 160*c* can implement MIMO technology. Thus, the eNode-B 160*a*, for example, can use multiple antennas to transmit wireless signals to, and/or receive wireless signals from, the WTRU 102*a*.

Each of the eNode-Bs 160*a*, 160*b*, 160*c* can be associated with a particular cell (not shown) and can be configured to handle radio resource management decisions, handover decisions, scheduling of users in the UL and/or DL, and the like. As shown in FIG. 1C, the eNode-Bs 160*a*, 160*b*, 160*c* can communicate with one another over an X2 interface.

The CN 106 shown in FIG. 1C can include a mobility management entity (MME) 162, a serving gateway (SGW) 164, and a packet data network (PDN) gateway (or PGW) 166. While each of the foregoing elements are depicted as part of the CN 106, it will be appreciated that any of these elements can be owned and/or operated by an entity other than the CN operator.

The MME 162 can be connected to each of the eNode-Bs 162*a*, 162*b*, 162*c* in the RAN 104 via an S1 interface and can serve as a control node. For example, the MME 162 can be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 can provide a control plane function for switching between the RAN 104 and other RANs (not shown) that employ other radio technologies, such as GSM and/or WCDMA.

The SGW 164 can be connected to each of the eNode Bs 160*a*, 160*b*, 160*c* in the RAN 104 via the S1 interface. The SGW 164 can generally route and forward user data packets to/from the WTRUs 102*a*, 102*b*, 102*c*. The SGW 164 can perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 can be connected to the PGW 166, which can provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 can facilitate communications with other networks. For example, the CN 106 can provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 can include, or can communicate with, an IP gateway (e.g., an IP multimedia subsystem (IMS) server) that serves as an interface between the CN 106 and the PSTN 108. In addition, the CN 106 can provide the WTRUs 102*a*, 102*b*, 102*c* with access to the other networks 112, which can include other wired and/or wireless networks that are owned and/or operated by other service providers.

Although the WTRU is described in FIGS. 1A-1D as a wireless terminal, it is contemplated that in certain representative embodiments that such a terminal can use (e.g., temporarily or permanently) wired communication interfaces with the communication network.

In representative embodiments, the other network 112 can be a WLAN.

A WLAN in Infrastructure Basic Service Set (BSS) mode can have an Access Point (AP) for the BSS and one or more stations (STAs) associated with the AP. The AP can have an access or an interface to a Distribution System (DS) or another type of wired/wireless network that carries traffic in to and/or out of the BSS. Traffic to STAs that originates from outside the BSS can arrive through the AP and can be delivered to the STAs. Traffic originating from STAs to destinations outside the BSS can be sent to the AP to be delivered to respective destinations. Traffic between STAs within the BSS can be sent through the AP, for example, where the source STA can send traffic to the AP and the AP can deliver the traffic to the destination STA. The traffic between STAs within a BSS can be considered and/or referred to as peer-to-peer traffic. The peer-to-peer traffic can be sent between (e.g., directly between) the source and destination STAs with a direct link setup (DLS). In certain representative embodiments, the DLS can use an 802.11e DLS or an 802.11z tunneled DLS (TDLS). A WLAN using an Independent BSS (IBSS) mode can not have an AP, and the STAs (e.g., all of the STAs) within or using the IBSS can communicate directly with each other. The IBSS mode of communication can sometimes be referred to herein as an "ad-hoc" mode of communication.

When using the 802.11ac infrastructure mode of operation or a similar mode of operations, the AP can transmit a beacon on a fixed channel, such as a primary channel. The primary channel can be a fixed width (e.g., 20 MHz wide bandwidth) or a dynamically set width via signaling. The primary channel can be the operating channel of the BSS and can be used by the STAs to establish a connection with the AP. In certain representative embodiments, Carrier Sense Multiple Access with Collision Avoidance (CSMA/CA) can be implemented, for example in in 802.11 systems. For CSMA/CA, the STAs (e.g., every STA), including the AP, can sense the primary channel. If the primary channel is sensed/detected and/or determined to be busy by a particular STA, the particular STA can back off. One STA (e.g., only one station) can transmit at any given time in a given BSS.

High Throughput (HT) STAs can use a 40 MHz wide channel for communication, for example, via a combination of the primary 20 MHz channel with an adjacent or nonadjacent 20 MHz channel to form a 40 MHz wide channel.

Very High Throughput (VHT) STAs can support 20 MHz, 40 MHZ, 80 MHZ, and/or 160 MHz wide channels. The 40 MHZ, and/or 80 MHz, channels can be formed by combining contiguous 20 MHz channels. A 160 MHz channel can be formed by combining 8 contiguous 20 MHz channels, or by combining two non-contiguous 80 MHz channels, which can be referred to as an 80+80 configuration. For the 80+80 configuration, the data, after channel encoding, can be passed through a segment parser that can divide the data into two streams. Inverse Fast Fourier Transform (IFFT) processing, and time domain processing, can be done on each stream separately. The streams can be mapped on to the two 80 MHz channels, and the data can be transmitted by a transmitting STA. At the receiver of the receiving STA, the above described operation for the 80+80 configuration can be reversed, and the combined data can be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHZ, 4 MHZ, 8 MHZ, and 16 MHz bandwidths using non-TVWS spectrum. According to a representative embodiment, 802.11ah can support Meter Type Control/Machine-Type Communications, such as MTC devices in a macro coverage area. MTC devices can have certain capabilities, for example, limited capabilities including support for (e.g., only support for) certain and/or limited bandwidths. The MTC devices can include a battery with a battery life above a threshold (e.g., to maintain a very long battery life).

WLAN systems, which can support multiple channels, and channel bandwidths, such as 802.11n, 802.11ac, 802.11af, and 802.11ah, include a channel which can be designated as the primary channel. The primary channel can have a bandwidth equal to the largest common operating bandwidth supported by all STAs in the BSS. The bandwidth of the primary channel can be set and/or limited by a STA, from among all STAs in operating in a BSS, which supports the smallest bandwidth operating mode. In the example of 802.11ah, the primary channel can be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings can depend on the status of the primary channel. If the primary channel is busy, for example, due to a STA (which supports only a 1 MHz operating mode), transmitting to the AP, the entire available frequency bands can be considered busy even though a majority of the frequency bands remains idle and can be available.

In the United States, the available frequency bands, which can be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
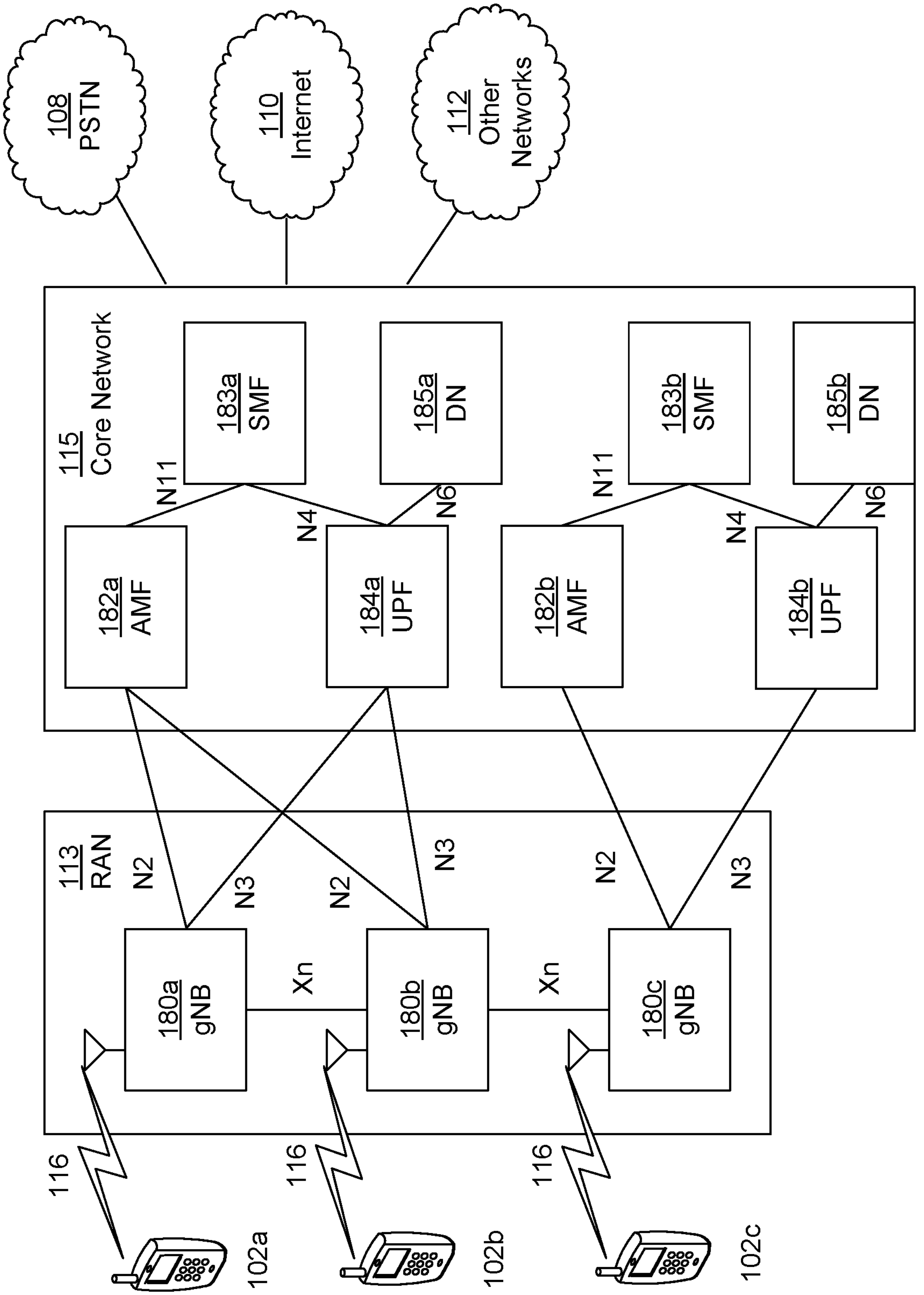
FIG. 1D is a system diagram illustrating a further example RAN and a further example CN that can be used within the communications system illustrated in FIG. 1A according to an embodiment.

FIG. 1D is a system diagram illustrating the RAN 113 and the CN 115 according to an embodiment. As noted above, the RAN 113 can employ an NR radio technology to communicate with the WTRUs 102*a*, 102*b*, 102*c* over the air interface 116. The RAN 113 can also be in communication with the CN 115.

The RAN 113 can include gNBs 180*a*, 180*b*, 180*c*, though it will be appreciated that the RAN 113 can include any number of gNBs while remaining consistent with an embodiment. The gNBs 180*a*, 180*b*, 180*c* can each include one or more transceivers for communicating with the WTRUs 102*a*, 102*b*, 102*c* over the air interface 116. In one embodiment, the gNBs 180*a*, 180*b*, 180*c* can implement MIMO technology. For example, gNBs 180*a*, 108*b* can utilize beamforming to transmit signals to and/or receive signals from the gNBs 180*a*, 180*b*, 180*c*. Thus, the gNB 180*a*, for example, can use multiple antennas to transmit wireless signals to, and/or receive wireless signals from, the WTRU 102*a*. In an embodiment, the gNBs 180*a*, 180*b*, 180*c* can implement carrier aggregation technology. For example, the gNB 180*a* can transmit multiple component carriers to the WTRU 102*a* (not shown). A subset of these component carriers can be on unlicensed spectrum while the remaining component carriers can be on licensed spectrum. In an embodiment, the gNBs 180*a*, 180*b*, 180*c* can implement Coordinated Multi-Point (COMP) technology. For example, WTRU 102*a* can receive coordinated transmissions from gNB 180*a* and gNB 180*b* (and/or gNB 180*c*).

The WTRUs 102*a*, 102*b*, 102*c* can communicate with gNBs 180*a*, 180*b*, 180*c* using transmissions associated with a scalable numerology. For example, the OFDM symbol spacing and/or OFDM subcarrier spacing can vary for different transmissions, different cells, and/or different portions of the wireless transmission spectrum. The WTRUs 102*a*, 102*b*, 102*c* can communicate with gNBs 180*a*, 180*b*,

180*c* using subframe or transmission time intervals (TTIs) of various or scalable lengths (e.g., containing varying number of OFDM symbols and/or lasting varying lengths of absolute time).

The gNBs 180*a*, 180*b*, 180*c* can be configured to communicate with the WTRUs 102*a*, 102*b*, 102*c* in a standalone configuration and/or a non-standalone configuration. In the standalone configuration, WTRUs 102*a*, 102*b*, 102*c* can communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* can utilize one or more of gNBs 180*a*, 180*b*, 180*c* as a mobility anchor point. In the standalone configuration, WTRUs 102*a*, 102*b*, 102*c* can communicate with gNBs 180*a*, 180*b*, 180*c* using signals in an unlicensed band. In a non-standalone configuration WTRUs 102*a*, 102*b*, 102*c* can communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* can implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* can serve as a mobility anchor for WTRUs 102*a*, 102*b*, 102*c* and gNBs 180*a*, 180*b*, 180*c* can provide additional coverage and/or throughput for servicing WTRUs 102*a*, 102*b*, 102*c*.

Each of the gNBs 180*a*, 180*b*, 180*c* can be associated with a particular cell (not shown) and can be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* can communicate with one another over an Xn interface.

The CN 115 shown in FIG. 1D can include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements can be owned and/or operated by an entity other than the CN operator.

The AMF 182*a*, 182*b* can be connected to one or more of the gNBs 180*a*, 180*b*, 180*c* in the RAN 113 via an N2 interface and can serve as a control node. For example, the AMF 182*a*, 182*b* can be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing can be used by the AMF 182*a*, 182*b* in order to customize CN support for WTRUs 102*a*, 102*b*, 102*c* based on the types of services being utilized WTRUs 102*a*, 102*b*, 102*c*. For example, different network slices can be established for different use cases such as services relying on ultra-reliable low latency (URLLC) access, services relying on enhanced massive mobile broadband (eMBB) access, services for machine type communication (MTC) access, and/or the like. The AMF 162 can provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* can be connected to an AMF 182*a*, 182*b* in the CN 115 via an N11 interface. The SMF 183*a*, 183*b* can also be connected to a UPF 184*a*, 184*b* in the CN 115 via an N4 interface. The SMF 183*a*, 183*b* can select and control the UPF 184*a*, 184*b* and configure the routing of traffic through the UPF 184*a*, 184*b*. The SMF 183*a*, 183*b* can perform other functions, such as managing and allocating UE IP address, managing PDU sessions, controlling policy enforcement and QoS, providing downlink data notifications, and the like. A PDU session type can be IP-based, non-IP based, Ethernet-based, and the like.

The UPF 184*a*, 184*b* can be connected to one or more of the gNBs 180*a*, 180*b*, 180*c* in the RAN 113 via an N3 interface, which can provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* can perform other functions, such as routing and forwarding packets, enforcing user plane policies, supporting multi-homed PDU sessions, handling user plane QoS, buffering downlink packets, providing mobility anchoring, and the like.

The CN 115 can facilitate communications with other networks. For example, the CN 115 can include, or can communicate with, an IP gateway (e.g., an IP multimedia subsystem (IMS) server) that serves as an interface between the CN 115 and the PSTN 108. In addition, the CN 115 can provide the WTRUs 102*a*, 102*b*, 102*c* with access to the other networks 112, which can include other wired and/or wireless networks that are owned and/or operated by other service providers. In one embodiment, the WTRUs 102*a*, 102*b*, 102*c* can be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, can be performed by one or more emulation devices (not shown). The emulation devices can be one or more devices configured to emulate one or more, or all, of the functions described herein. For example, the emulation devices can be used to test other devices and/or to simulate network and/or WTRU functions.

The emulation devices can be designed to implement one or more tests of other devices in a lab environment and/or in an operator network environment. For example, the one or more emulation devices can perform the one or more, or all, functions while being fully or partially implemented and/or deployed as part of a wired and/or wireless communication network in order to test other devices within the communication network. The one or more emulation devices can perform the one or more, or all, functions while being temporarily implemented/deployed as part of a wired and/or wireless communication network. The emulation device can be directly coupled to another device for purposes of testing and/or can performing testing using over-the-air wireless communications.

The one or more emulation devices can perform the one or more, including all, functions while not being implemented/deployed as part of a wired and/or wireless communication network. For example, the emulation devices can be utilized in a testing scenario in a testing laboratory and/or a non-deployed (e.g., testing) wired and/or wireless communication network in order to implement testing of one or more components. The one or more emulation devices can be test equipment. Direct RF coupling and/or wireless communications via RF circuitry (e.g., which can include one or more antennas) can be used by the emulation devices to transmit and/or receive data.

This application describes a variety of aspects, including tools, features, examples, models, approaches, etc. Many of these aspects are described with specificity and, at least to show the individual characteristics, are often described in a manner that can sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 5-10 described herein can provide some examples, but other examples are contemplated. The discussion of FIGS. 5-10 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" can be used interchangeably, the terms "pixel" and "sample" can be used interchangeably, the terms "image," "picture" and "frame" can be used interchangeably.

Various methods are described herein, and each of the methods comprises one or more steps or actions for achieving the described method. Unless a specific order of steps or actions is required for proper operation of the method, the order and/or use of specific steps and/or actions can be modified or combined. Additionally, terms such as "first", "second", etc. can be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and can occur, for example, before, during, or in an overlapping time period with the second decoding.

Figure 2:
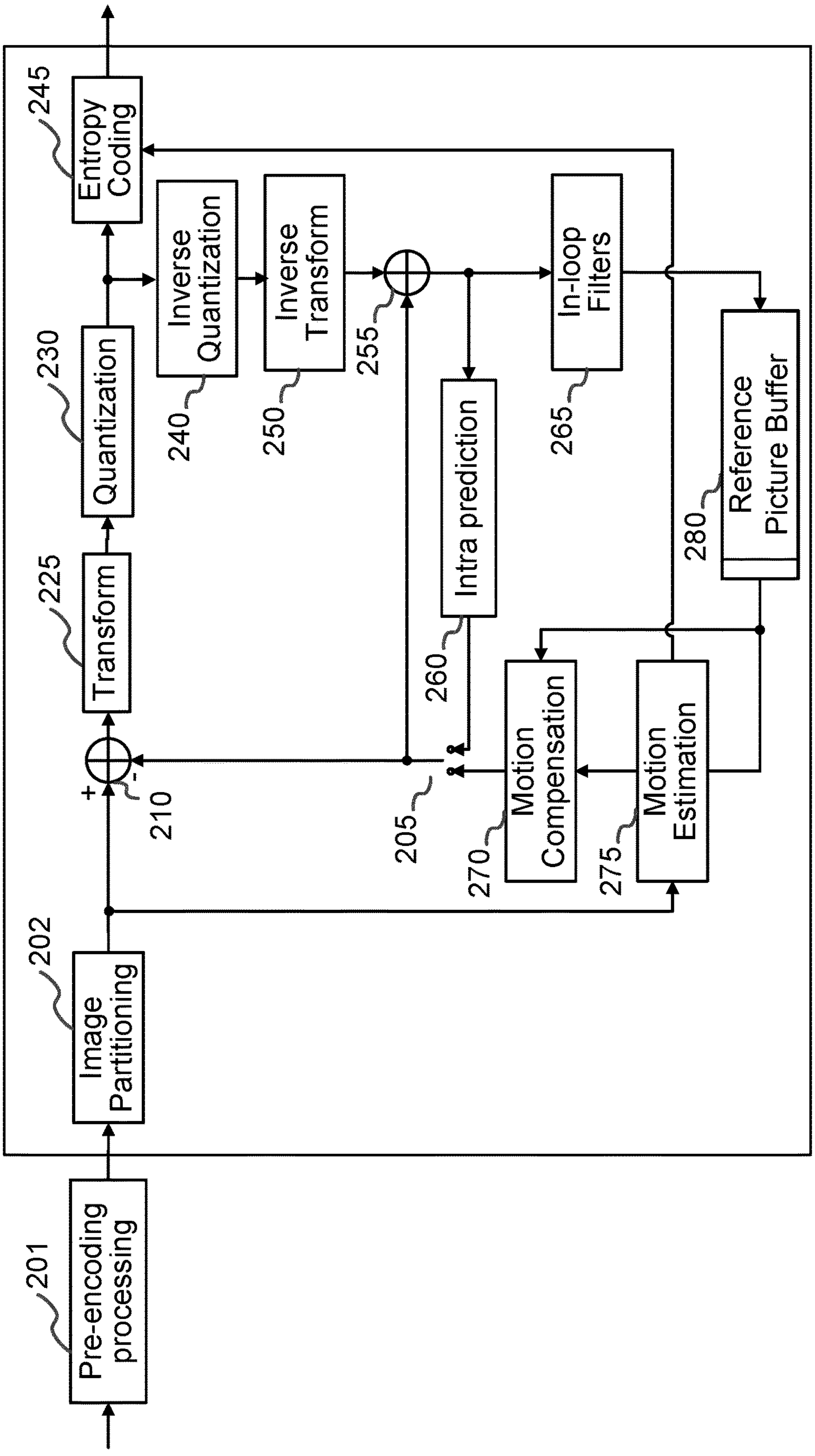
FIG. 2 illustrates an example video encoder.
Figure 3:
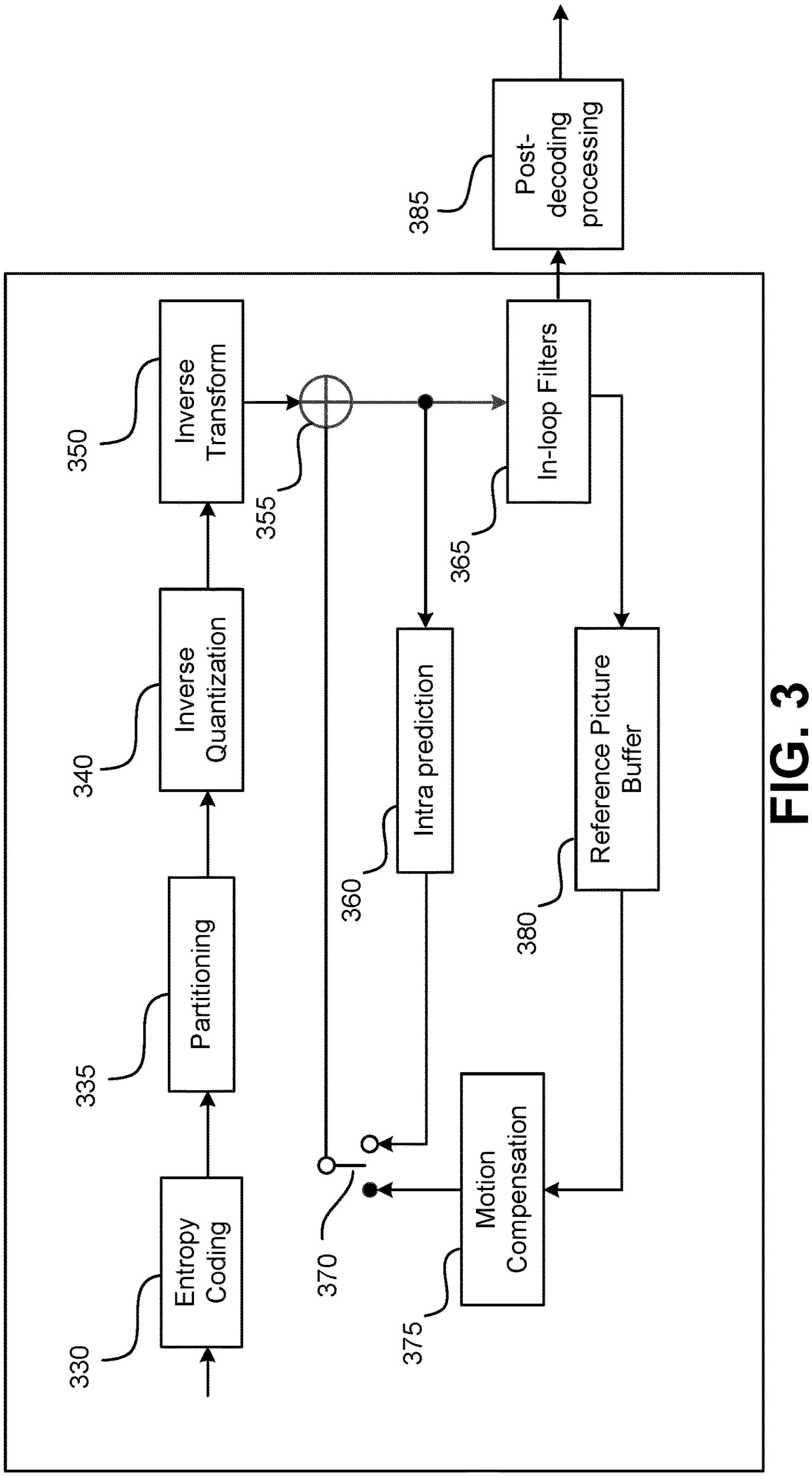
FIG. 3 illustrates an example video decoder.

Various methods and other aspects described in this application can be used to modify modules, for example, decoding modules, of a video encoder 200 and decoder 300 as shown in FIG. 2 and FIG. 3. Moreover, the subject matter disclosed herein can be applied, for example, to any type, format or version of video coding, whether described in a standard or a recommendation, whether pre-existing or future-developed, and extensions of any such standards and recommendations. Unless indicated otherwise, or technically precluded, the aspects described in this application can be used individually or in combination.

Various numeric values are used in examples described the present application, such as bits, bit depth, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence can go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder can therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block can be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) can be sent to a display device for rendering to a user.

Figure 4:
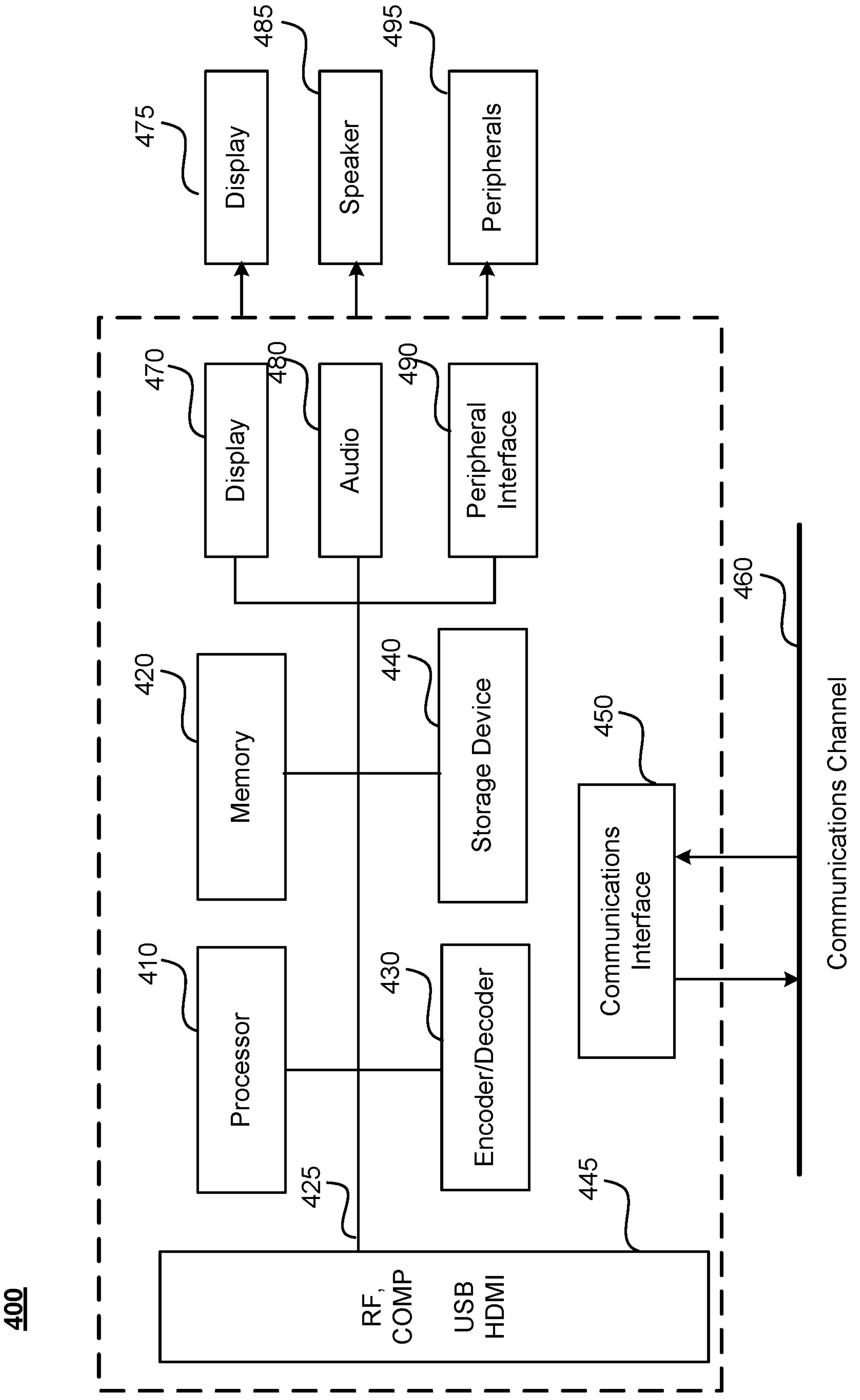
FIG. 4 illustrates an example of a a system in which various aspects and examples can be implemented.

FIG. 4 is a diagram showing an example of a system in which various aspects and examples described herein can be implemented. System 400 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, can be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that can be included in a device to perform the encoding and/or decoding functions. As is known, a device can include one or both of the encoding and decoding modules. Additionally, encoder/decoder module 430 can be implemented as a separate element of system 400 or can be incorporated within processor 410 as a combination of hardware and software as known to those skilled in the art.

Program code to be loaded onto processor 410 or encoder/decoder 430 to perform the various aspects described in this document can be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device can be either the processor 410 or the encoder/decoder module 430) is used for one or more of these functions. The external memory can be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 can be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, can be implemented, for example, within a separate input processing IC or within processor 410 as necessary. Similarly, aspects of USB or HDMI interface processing can be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 can be provided within an integrated housing, Within the integrated housing, the various elements can be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 can be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touchscreen display, an organic light-emitting diode (OLED) display, a curved display, and/or a foldable display. The display 475 can be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices can be communicatively coupled to system 400 via dedicated connections through respective interfaces 470, 480, and 490. Alternatively, the output devices can be connected to system 400 using the communications channel 460 via the communications interface 450. The display 475 and speakers 485 can be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal can be provided via dedicated output connections, including, for example, HDMI ports, USB ports, or COMP outputs.

The examples can be carried out by computer software implemented by the processor 410 or by hardware, or by a combination of hardware and software. As a non-limiting example, the examples can be implemented by one or more integrated circuits. The memory 420 can be of any type appropriate to the technical environment and can be implemented using any appropriate data storage technology, such as optical memory devices, magnetic memory devices, semiconductor-based memory devices, fixed memory, and removable memory, as non-limiting examples. The processor 410 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, determining that template-based prediction is enabled for a current block; determining a prediction block and a template orientation for the current block based on template matching; and decoding the current block based on the prediction block and the template orientation, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining that template-based prediction is enabled for a current block; determining a prediction block and a template orientation for the current block based on template matching; and encoding the current block based on the prediction block and the template orientation, etc.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application can refer to "determining" various pieces of information. Determining the information can include one or more of, for example, estimating the information, calculating the information, predicting the information, or retrieving the information from memory. Obtaining can include receiving, retrieving, constructing, generating, and/or determining.

Further, this application can refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application can refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as is clear to one of ordinary skill in this and related arts, for as many items as are listed.

Also, as used herein, the word "signal" refers to, among other things, indicating something to a corresponding decoder. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various examples. It is to be appreciated that signaling can be accomplished in a variety of ways. For example, one or more syntax elements, flags, and so forth are used to signal information to a corresponding decoder in various examples. While the preceding relates to the verb form of the word "signal", the word "signal" can (e.g., can also) be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described example. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on, or accessed or received from, a processor-readable medium.

Many examples are described herein. Features of examples can be provided alone or in any combination, across various claim categories and types. Further, examples can include one or more of the features, devices, or aspects described herein, alone or in any combination, across various claim categories and types. For example, features described herein can be implemented in a bitstream or signal that includes information generated as described herein. The information can allow a decoder to decode a bitstream, the encoder, bitstream, and/or decoder according to any of the embodiments described. For example, features described herein can be implemented by creating and/or transmitting and/or receiving and/or decoding a bitstream or signal. For example, features described herein can be implemented a method, process, apparatus, medium storing instructions, medium storing data, or signal. For example, features described herein can be implemented by a TV, set-top box, cell phone, tablet, or other electronic device that performs decoding. The TV, set-top box, cell phone, tablet, or other electronic device can display (e.g., using a monitor, screen, or other type of display) a resulting image (e.g., an image from residual reconstruction of the video bitstream). The TV, set-top box, cell phone, tablet, or other electronic device can receive a signal including an encoded image and perform decoding.

The syntax elements values can be predicted from previously coded blocks whose pixels (e.g., L-shaped pixels) surrounding the blocks match the current block template. The examples described herein can increase coding gain and/or decrease signaling of syntax elements.

For example, an encoder can determine whether to use a template-based coding mode for the current block. Based on the determination to use template-based coding mode for the current block, the encoder can bypass signaling of at least one syntax element for the current block. The current block can be encoded based on template-based coding mode. Based on the determination that template-based coding mode is not used for the current block, the at least one syntax element for the current block can be included in the bitstream.

These examples can be performed by a device with at least one processor. The device can be an encoder or a decoder. These examples can be performed by a computer program product which is stored on a non-transitory computer readable medium and includes program code instructions. These examples can be performed by a computer program comprising program code instructions. These examples can be performed by a bitstream comprising information representative of template matching prediction mode.

Examples of intra template matching prediction (Intra TMP) are provided herein. Intra TMP is an intra prediction mode that may copy the best prediction block from the reconstructed part of the current frame, whose L-shaped template matches the current template. For a predefined search range, the encoder may search for the most similar template to the current template in a reconstructed part of the current frame and may use the corresponding block as a prediction block. The encoder may signal the usage of this mode, and the same prediction operation may be performed at the decoder side.

Figure 5:
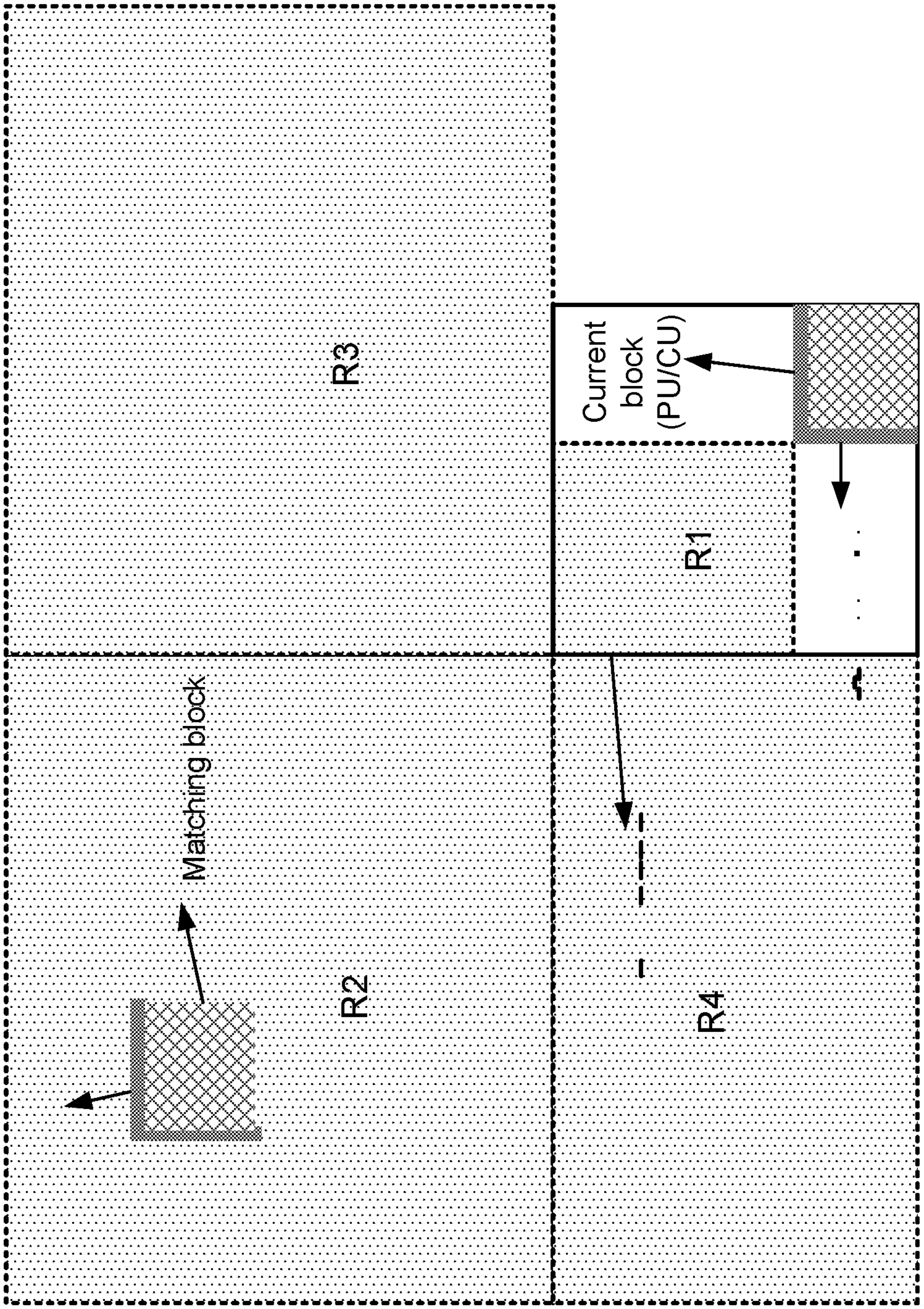
FIG. 5 illustrates an example of an intra template matching search area.

FIG. 5 illustrates an example of an intra template matching search area. The prediction signal may be generated by matching the L-shaped causal neighbor of the current block with another block in a predefined search area in FIG. 5 including:

| |
|---|
| R1: current CTU |
| R2: top-left CTU |
| R3: above CTU |
| R4: left CTU |

Sum of absolute differences (SAD) may be used as a cost function. Within regions (e.g., within each region), the decoder may search for the template that has the least SAD with respect to the current one and may use its corresponding block as a prediction block. The dimensions of the regions (SearchRange_w, SearchRange_h) may be set proportional to the block dimension (BlkW, BlkH) to have a fixed number of SAD comparisons per pixel. That is:

$$\text{SearchRange\_w} = a * BlkW$$

$$\text{SearchRange\_h} = a * BlkH$$

where 'a' may be a constant that controls the gain/complexity trade-off. For example, 'a' may be equal to 5.

The intra template matching tool may be enabled for CUs with sizes less than or equal to 64 in width and height. This maximum CU size for intra template matching may be configurable. The intra template matching prediction mode may be signaled at the CU level through an intra template matching prediction indication. The intra template matching prediction mode may be enabled at the CU level through a template matching prediction indication if decoder side intra mode derivation (DIMD) is not enabled (e.g., DIMD=0). Although intra template matching examples are described herein, examples herein may also be applied for inter template matching.

Figure 6:
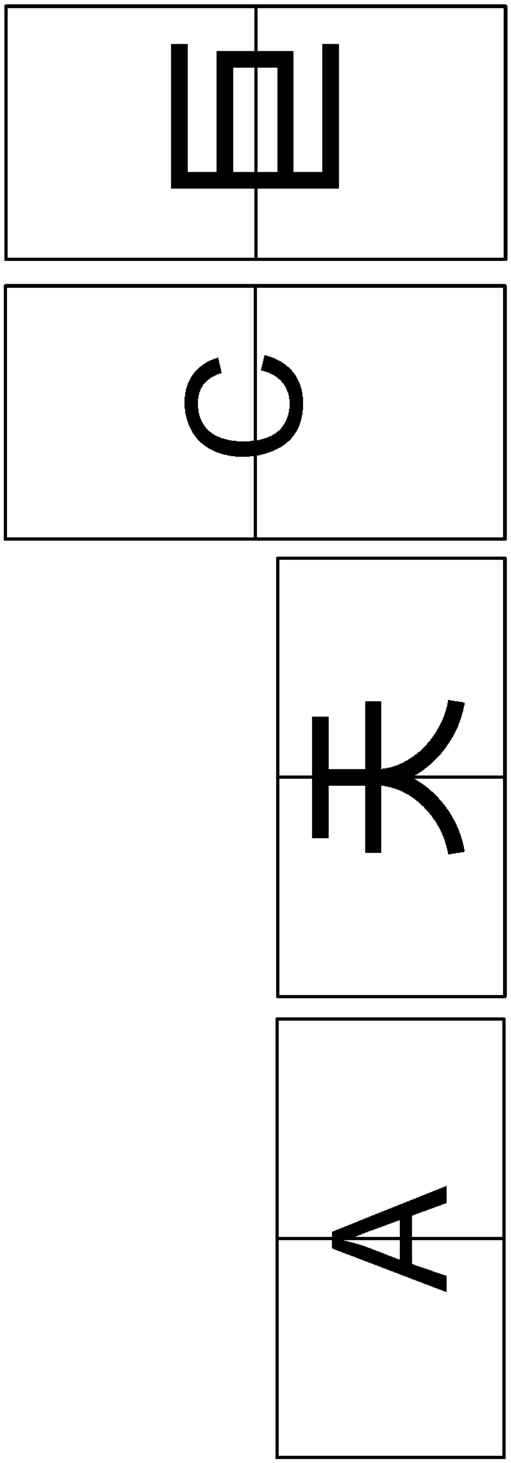
FIG. 6 illustrates an example of symmetry in screen content pictures.

FIG. 6 illustrates an example of symmetry in screen content pictures. In examples, intra block copy (IBC) mode may be extended with a flipping operation. The encoder may opt to flip (e.g., horizontally, vertically, or diagonally flip) a prediction block obtained by the IBC and signal a syntax element indicating the flip direction. This may allow some patterns to be repeated with reversed spatial ordering (e.g., as shown in FIG. 6).

In examples, an intra template matching process may allow flips (e.g., horizontal, vertical, and diagonal flips), rotations, and/or other reorientations. This may allow some patterns to be repeated with reversed or other adjusted spatial order. This may involve less signaling as the intra template matching search can yield the flipping direction.

Figure 7:
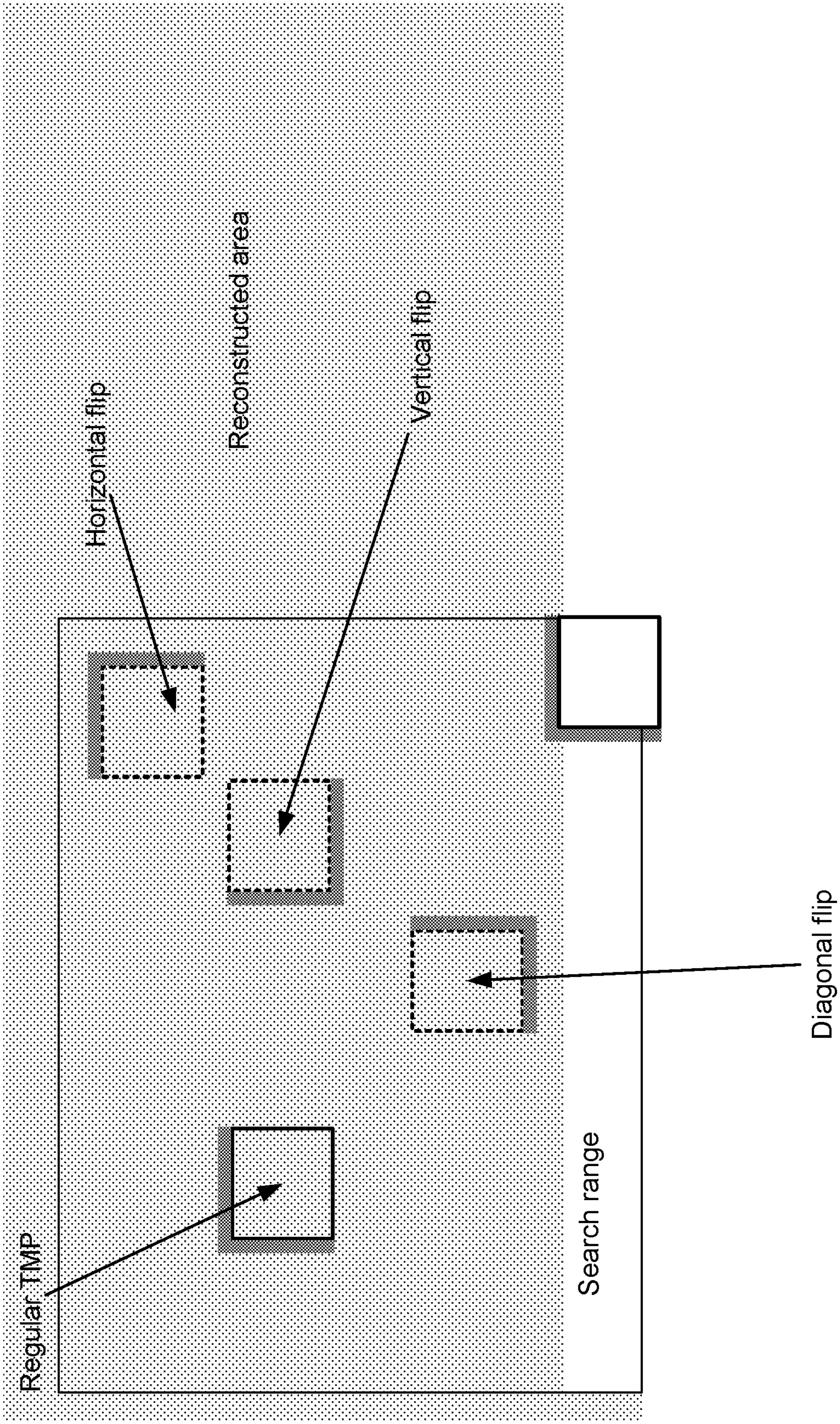
FIG. 7 illustrates an example of template matching with flip directions.

FIG. 7 illustrates an example of template matching augmented with different template orientations (e.g., flipped directions and/or rotations). To perform template matching with different template orientations, the following may be performed:

```
Set BestDist to Max
Set BestFlip to NoFlip
```

-continued

```
Set BestPos = (0,0)
Loop over all possible flips (including no flip)
  Set CurFlip to the current flip direction
  For each position inside the search range
    Set CurPos to the current position
    Constructed a template according to the flip direction
    Measure the current distance (CurDist) with respect to the current
    block template
    If (CurDist < BestDist)
      BestDist = CurDist
      BestFlip = CurFlip
      BestPos = CurPos
    End
  End
End
Copy the prediction block from BestPos
Flip prediction block according to BestFlip
```

In examples, a decoder or an encoder may determine that template-based prediction is enabled for a current block. A prediction block and a template orientation for the current block may be determined for the current block based on template matching. The current block may be decoded or encoded based on the prediction block and the template orientation. Template matching prediction (TMP) may be performed by matching the template of a prediction block within a specific range inside a reconstructed area. The template may be composed of L shaped pixels (e.g., template sample values) that surround the prediction block on the upper and left directions (e.g., as shown in FIG. 7). In examples, the template may be adjusted (e.g., as shown in FIG. 7). The adjusted template may be flipped horizontally, flipped vertically, flipped diagonally, rotated, or adjusted in other ways.

For finding the prediction block for the current block with a given orientation (e.g., no flip, flipped horizontally, flipped vertically, flipped diagonally, rotated, or other orientational adjustments), the decoder or encoder may obtain a number of template orientations and determine the template orientation for the current block from the number of template orientations. In examples, the TMP search may be repeated to find the best template orientation. For finding the best prediction block with the best template orientation, a number of template differences may be computed between a template of the current block and each of a number of templates of prediction blocks at given template orientations (e.g., no flip, flip horizontally, vertically, diagonally, rotated, or other orientational adjustments).

The best prediction block with the best template orientation may be the smallest of the number of template differences computed. The computed template differences may indicate sample value differences between the samples in the template of the current block and each of the samples in the templates of the prediction blocks at given template orientations. In examples, a first template difference may be computed between a template of the current block and a template of a first prediction block in a first template orientation. A second template difference may be computed between the template of the current block and a template of a second prediction block in a second template orientation. The best prediction with the best template orientation for the current block may be the smaller template difference of the first template difference and the second template difference.

The prediction block (e.g., best prediction block) may be obtained (e.g., copied) while its orientation is changed (e.g., while being flipped). The prediction block may be adjusted based on the determined template orientation (e.g., best template orientation). The current block may be decoded or encoded based on the adjusted prediction block. In examples, the determined template orientation may be a horizontally flipped template orientation, a vertically flipped template orientation, a diagonally flipped template orientation, or a rotated template orientation. The prediction block may be reoriented based on the determined template orientation. The current block may be decoded or encoded based on the reoriented block.

Examples of template matching using reduced range with refinement may be performed by the decoder and/or encoder. In examples, the complexity of intra template matching may be multiplied by the number of tested flip directions (e.g., this is because the search operation may be repeated as much as the number of allowed flips). Two template matching searches may be applied. In examples, a matching block may be found using a first template match search (e.g., using regular TMP associated with an upright template orientation). A refined search area may be determined for performing a second template matching search based on the matching block. In examples, the best template orientation (e.g., the best flip) may be found around the position of the matching block. The area around the position of the matching block may be the refined search area. The prediction block and the template orientation for the current block may be determined based on the second template matching search performed within the refined search area. This may provide less searching for finding the template orientation (e.g., best flip) since it may be limited to a small range around the matching block. The current block may be decoded and/or encoded based on the prediction block and the template orientation found within the refined search area.

Figure 8:
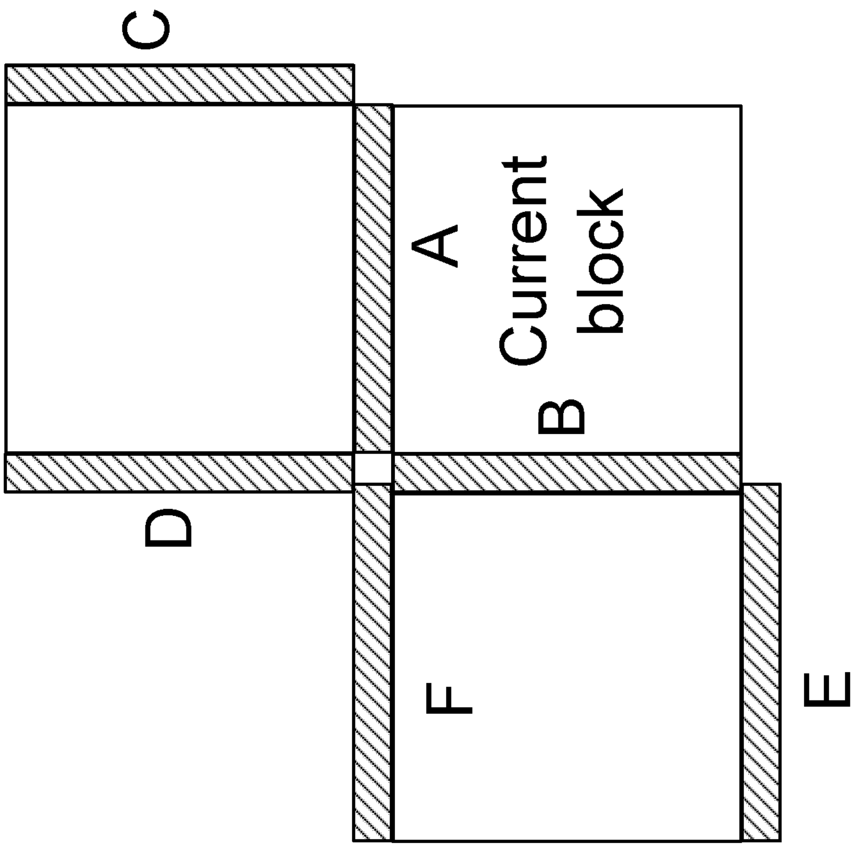
FIG. 8 illustrates an example of search template sharing.

FIG. 8 illustrates an example of search template sharing. Multiple (e.g., two) template matching searches may be performed. A matching block may be identified based on a first template matching search. Template differences may be computed between templates of a current block and templates of the matching block. A candidate template orientation for a second template matching search may be based on the computed template differences. The decoder and/or encoder may perform the second template matching search based on the determined candidate template orientation. The computed template differences may indicate sample value differences between the samples in the template of the current block and each of the samples in the templates of the matching block at given template orientations.

In examples, a first template difference may be computed based on a top template of the current block (e.g., A as shown in FIG. 8) and a top template of the matching block, a second template difference may be computed based on a left template of the current block (e.g., B as shown in FIG. 8) and a left template of the matching block, and a third template difference may be computed based on both the top template and the left template of the current block and both the top template and the left template of the matching block.

Based on the first template difference being the smallest difference among the first, second, and third template differences, a vertically flipped template orientation may be determined to be the candidate template orientation for the second template matching search (e.g., the vertically flipped version of the top block, A+D as shown in FIG. 8). In examples, a diagonally flipped version of the top block may also be used (e.g., A+C as shown in FIG. 8). Based on the second template difference being the smallest difference among the first, second, and third template differences, a horizontally flipped template orientation may be determined to be the candidate template orientation for the second template matching search (e.g., the horizontally flipped version of the left block, B+F as shown in FIG. 8). In examples, a diagonally flipped version of the left block may also be used (e.g., B+E as shown in FIG. 8). Based on the third template difference being the smallest difference among the first, second, and third template differences, an upright template orientation of the current block may be determined to be the candidate template orientation for the second template matching search (e.g., A+B as shown in FIG. 8).

In the examples using search template sharing, the flipped versions of the top block and/or the left block may be examined only if necessary. In examples, the search template sharing examples may be used if the template size is 1 (e.g., the template sizes of the matching block and the current block are equal). In examples, the flipped versions of the top block and/or of the left may only be examined up to a number of times.

In examples, the candidate template orientation may be based on the smallest template difference among two of the first, second, and third template differences. In examples, the second template matching search may be performed based on using only the flipped version (e.g., vertically or diagonally) of the top block as the candidate orientation, the flipped version (e.g., horizontally or diagonally) of the left block as the candidate orientation, or the upright version of the current block as the candidate orientation. This may only require one or two additional computations added on top of the TMP computations.

An encoder may include an indication in video data to indicate whether to perform a multi-template orientation search (e.g., for a coding block). The encoder may determine whether template matching search is to be performed in multiple template orientations and may indicate the determination in video data. The decoder may receive the indication of whether to perform a multi-template orientation search for a second coding block. Based on the multi-template orientation search indication, the decoder may determine whether to perform the multi-template orientation search. Based on indication indicating to enable the multi-template orientation search, the decoder may obtain a plurality of template orientations. The template orientation of the coding block may be determined from the plurality of template orientations (e.g., as described herein). Based on the indication indicating to disable the multi-template orientation search for a coding block, the decoder may perform template matching search based on a default template orientation (e.g., upright orientation).

The multi-template orientation search indication (e.g., flag) or associated indications may be signaled at the CU level. In some examples, a higher level indication may be used to indicate if the flipping is allowed for the current slice (e.g., slice indication), current picture (e.g., picture header indication), or the entire sequence (e.g., SPS indication).

Figure 9:
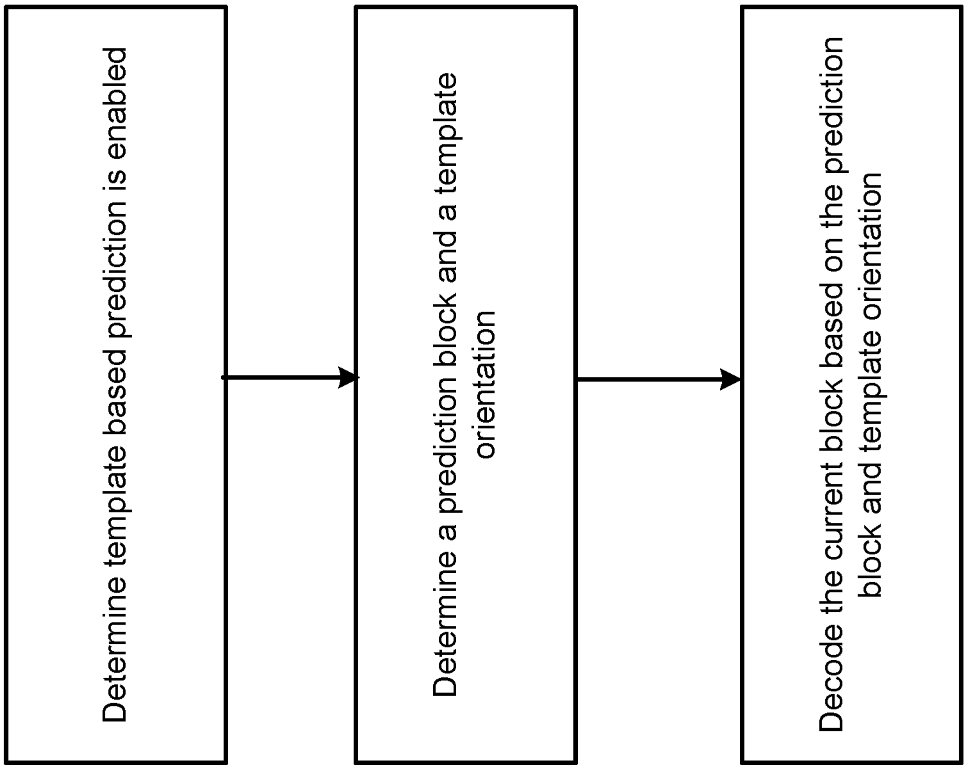
FIG. 9 illustrates an example decoding process with template matching search in different template orientations.

FIG. 9 illustrates an example decoding process with template matching search in different template orientations. As shown in FIG. 9, it may be determined that template-based prediction is enabled for a current block. A prediction block and a template orientation may be determined for the current block based on template matching (e.g., based on the determination that template-based prediction is enabled). The current block may be decoded based on the prediction block and the template orientation.

Figure 10:
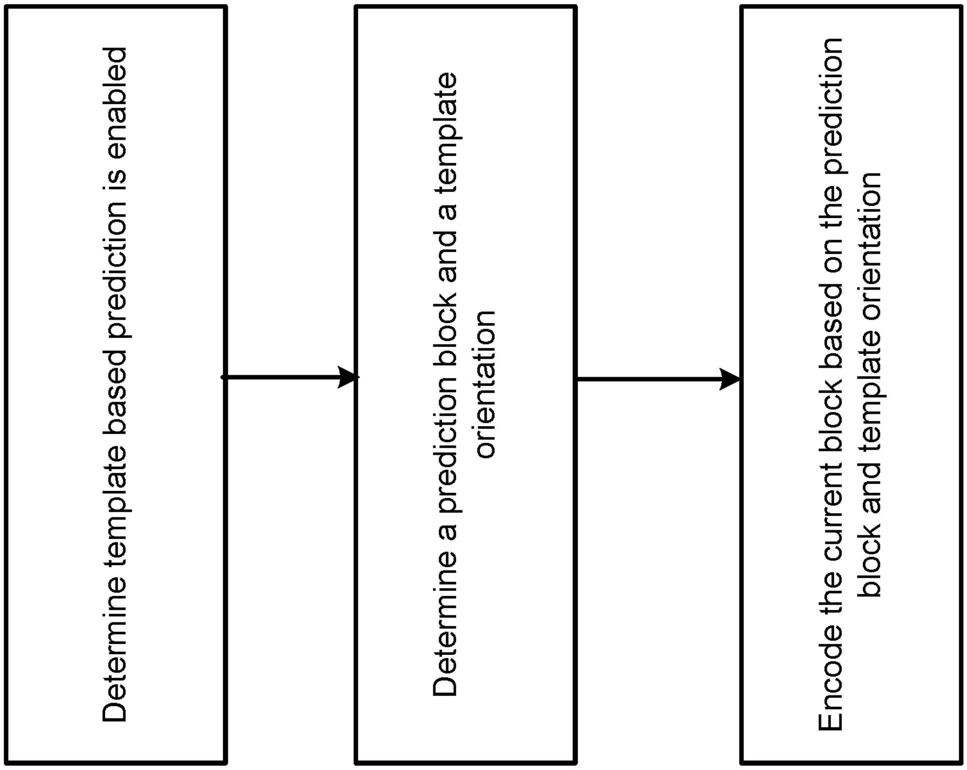
FIG. 10 illustrates an example encoding process with template matching search in different template orientations.

FIG. 10 illustrates an example encoding process with template matching search in different template orientations. As shown in FIG. 10, it may be determined that template-based prediction is enabled for a current block. A prediction block and a template orientation may be determined for the current block based on template matching (e.g., based on the determination that template-based prediction is enabled). The current block may be encoded based on the prediction block and the template orientation.

Although features and elements are described above in particular combinations, one of ordinary skill in the art will appreciate that each feature or element can be used alone or in any combination with the other features and elements. In addition, the methods described herein can be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software can be used to implement a radio frequency transceiver for use in a WTRU, UE, terminal, base station, RNC, or any host computer.

What is claimed:

1. A device for video decoding, comprising:

a processor configured to:

determine that intra template matching prediction mode is enabled for a current block;

determine a prediction block and a template orientation for the current block based on intra template matching; and decode the current block based on the prediction block and the template orientation.

2. The device of claim 1, wherein the processor is further configured to:

obtain a plurality of template orientations; and determine the template orientation from the plurality of template orientations.

3. The device of claim 1, wherein the processor is further configured to:

compute a first template difference between a template of the current block and a template of a first prediction block in a first template orientation;

compute a second template difference between the template of the current block and a template of a second prediction block in a second template orientation; and determine the prediction block and the template orientation for the current block based on a smaller template difference of the first template difference and the second template difference.

4. The device of claim 1, wherein the intra template matching is a second template matching search, and wherein the processor is further configured to:

determine a matching block based on a first template matching search associated with an upright template orientation; and determine a refined search area for performing the second template matching search based on the matching block, wherein the prediction block and the template orientation for the current block are determined based on the second template matching search performed within the refined search area.

5. The device of claim 1, wherein the processor is further configured to:

adjust the prediction block based on the determined template orientation, wherein the current block is decoded based on the adjusted prediction block.

6. The device of claim 1, wherein the determined template orientation is a horizontally flipped template orientation, a vertically flipped template orientation, a diagonally flipped template orientation, or a rotated template orientation, wherein the processor is further configured to:

reorient the prediction block based on the determined template orientation, wherein the current block is decoded based on the reoriented prediction block.

7. The device of claim 1, wherein the processor is further configured to:

determine a matching block based on a first template matching search;

compute a first template difference based on a top template of the current block and a top template of the matching block, a second template difference based on a left template of the current block and a left template of the matching block, and a third template difference based on the top template and the left template of the current block and the top template and the left template of the matching block; and determine a candidate template orientation for a second template matching search based on the first, second, and third template differences, wherein:

based on the first template difference being a smallest difference among the first, second, and third template differences, a vertically flipped template orientation is determined to be the candidate template orientation for the second template matching search, and based on the second template difference being the smallest difference among the first, second, and third template differences, a horizontally flipped template orientation is determined to be the candidate template orientation for the second template matching search; and perform the second template matching search based on the determined candidate template orientation.

8. The device of claim 1, wherein the processor is further configured to:

receive an indication indicating whether to perform a multi-template orientation search for a second coding block;

based on the indication indicating to perform the multi-template orientation search, obtain a plurality of template orientations and determine the template orientation for the second coding block from the plurality of template orientations; and based on the indication indicating to disable the multi-template orientation search for the second coding block, determine that the template orientation is upright.

9. A method for video decoding, the method comprising:

determining that intra template matching prediction mode is enabled for a current block;

determining a prediction block and a template orientation for the current block based on intra template matching; and decoding the current block based on the prediction block and the template orientation.

10. The method of claim 9, further comprising:

obtaining a plurality of template orientations; and determining the template orientation from the plurality of template orientations.

11. The method of claim 9, further comprising:

computing a first template difference between a template of the current block and a template of a first prediction block in a first template orientation;

computing a second template difference between the template of the current block and a template of a second prediction block in a second template orientation; and determining the prediction block and the template orientation for the current block based on a smaller template difference of the first template difference and the second template difference.

12. The method of claim 9, wherein the intra template matching is a second template matching search, and the method further comprising:

determining a matching block based on a first template matching search associated with an upright template orientation; and determining a refined search area for performing the second template matching search based on the matching block, wherein the prediction block and the template orientation for the current block are determined based on the second template matching search performed within the refined search area.

13. The method of claim 9, further comprising:

adjusting the prediction block based on the determined template orientation, wherein the current block is decoded based on the adjusted prediction block.

14. The method of claim 9, wherein the determined template orientation is a horizontally flipped template orientation, a vertically flipped template orientation, a diagonally flipped template orientation, or a rotated template orientation, further comprising:

reorienting the prediction block based on the determined template orientation, wherein the current block is decoded based on the reoriented prediction block.

15. The method of claim 9, further comprising:

determining a matching block based on a first template matching search;

computing a first template difference based on a top template of the current block and a top template of the matching block, a second template difference based on a left template of the current block and a left template of the matching block, and a third template difference based on the top template and the left template of the current block and the top template and the left template of the matching block; and determining a candidate template orientation for a second template matching search based on the first, second, and third template differences, wherein:

based on the first template difference being a smallest difference among the first, second, and third template differences, a vertically flipped template orientation is determined to be the candidate template orientation for the second template matching search, and based on the second template difference being the smallest difference among the first, second, and third template differences, a horizontally flipped template orientation is determined to be the candidate template orientation for the second template matching search; and performing the second template matching search based on the determined candidate template orientation.

16. The method of claim 9, further comprising:

receiving an indication indicating whether to perform a multi-template orientation search for a second coding block;

based on the indication indicating to perform the multi-template orientation search, obtaining a plurality of template orientations and determining the template orientation for the second coding block from the plurality of template orientations; and based on the indication indicating to disable the multi-template orientation search for the second coding block, determining that the template orientation is upright.

17. A device for video encoding, comprising:

a processor configured to:

determine that intra template matching prediction mode is enabled for a current block;

determine a prediction block and a template orientation for the current block based on intra template matching; and encode the current block based on the prediction block and the template orientation.

18. The device of claim 17, wherein the processor is further configured to:

obtain a plurality of template orientations; and determine the template orientation from the plurality of template orientations.

19. The device of claim 17, wherein the processor is further configured to:

compute a first template difference between a template of the current block and a template of a first prediction block in a first template orientation;

compute a second template difference between the template of the current block and a template of a second prediction block in a second template orientation; and determine the prediction block and the template orientation for the current block based on a smaller template difference of the first template difference and the second template difference.

20. The device of claim 17, wherein the intra template matching is a second template matching search, and wherein the processor is further configured to:

determine a matching block based on a first template matching search associated with an upright template orientation; and determine a refined search area for performing the second template matching search based on the matching block, wherein the prediction block and the template orientation for the current block are determined based on the second template matching search performed within the refined search area.

* * * * *